United States Patent [19]
Goldberg et al.

[11] 3,872,792
[45] Mar. 25, 1975

[54] FUZE

[75] Inventors: Harold Goldberg, Washington, D.C.; Milton Sanders, Stamford, Conn.

[73] Assignee: The United States of America as represented by the Secretary of the Army, Washington, D.C.

[22] Filed: Jan. 11, 1956

[21] Appl. No.: 558,596

[52] U.S. Cl. .......................... 102/70.2 P, 343/7 PF
[51] Int. Cl. .......................................... F42c 13/04
[58] Field of Search ............ 102/70.2; 343/5, 7, 10, 343/12, 14, 17.1, 17.2

[56] References Cited

UNITED STATES PATENTS

| | | | |
|---|---|---|---|
| 2,641,754 | 6/1953 | Clegg | 343/14 |
| 2,687,482 | 8/1954 | Harmon | 102/70.2 |
| 2,710,959 | 6/1955 | Pierce | 343/12 |

*Primary Examiner*—Benjamin A. Borchelt
*Assistant Examiner*—C. T. Jordan
*Attorney, Agent, or Firm*—Nathan Edelberg; Robert P. Gibson; Saul Elbaum

EXEMPLARY CLAIM

1. A radio-proximity ordnance fuze comprising: a generator of radio frequency energy; modulator means for modulating the frequency of said generator with a modulation frequency *fr;* antenna means for radiating energy from said generator and for receiving a portion of the energy thus radiated upon its return from a reflective target; mixer means for combining frequency-modulated radio-frequency energy thus received with a local frequency-modulated radio-frequency signal taken directly from said generator to obtain a mixer output signal having a component of frequency $nf_r$, $n$ being an integer; selective amplifier means peaked at the frequency $nf_r$ connected to the output of said mixer means for obtaining a return-derived-signal of frequency $nf_r$; a frequency multiplier connected to said modulator means for obtaining a reference signal of frequency $nf_r$ having a constant phase; adjustable phase shift means connected to the output of said frequency multiplier for adjusting the phase of said reference signal to a predetermined value; frequency heterodyning means connected to the outputs of said selective amplifier means and said adjustable phase shift means for obtaining at a first heterodyning means output a reference signal of frequency $nf_r - fo$, and at a second heterodyning output a return-derived-signal also of frequency $nf_r - fo$; frequency doubler means connected to said second heterodyning means output for obtaining a return-derived-signal of frequency $2(nf_r - fo)$; first squarer means connected to said first heterodyning means output for producing a square wave reference signal of frequency $nf_r$ - fo; second squarer means connected to the output of said frequency doubler for producing a square wave return-derived-signal of frequency $2(nf_r - fo)$; first pulse former means connected to the output of said first squarer means for producing a reference signal positive output pulse at the beginning of each positive-going step of said square wave reference signal; second pulse former means connected to the output of said second squarer means for producing a return-derived-signal positive output pulse at the beginning of each positive-going step of said square wave return-derived-signal; a bistable flip-flop circuit having an "on" state and an "off" state, said flip-flop circuit being adapted to be switched to the "on" state by said return-derived signal pulses and to be switched to the "off" state by said reference signal pulses, the output of said flip-flop circuit thereby being dependent upon the phase difference between said reference signal of frequency $nf_r - fo$ and of constant and predetermined phase and said return-derived-signal of frequency $nf_r - fo$ whose phase is dependent upon target distance; and detonator-firing means responsive to the attainment of the output of said flip-flop of at least a critical value.

1 Claim, 4 Drawing Figures

INVENTORS
Harold Goldberg
Milton Sanders

BY
W. E. Thibodeau, A. W. Dew and J. D. Edgerton
ATTORNEYS

INVENTORS
Harold Goldberg
Milton Sanders
BY
W. E. Thibodeau, A. W. Dew and J. D. Edgerton
ATTORNEYS INVENTORS
Harold Goldberg
Milton Sanders BY
W. E. Thibodeau, A. W. Dew and J. D. Edgerton
ATTORNEYS

FUZE

The invention described herein may be manufactured and used by or for the Government for governmental purposes without the payment to us of any royalty thereon.

This invention relates to ordnance fuzes and more particularly to radio proximity fuzes of the frequency- or phase-modulated type.

A proximity fuze of the frequency- or phase-modulated type is described in co-pending application Ser. No. 460,789 filed Oct. 6, 1954 by Henry P. Kalmus, Harold Goldberg and Milton Sanders. For convenience the term "frequency-modulated fuze" or "FM fuze" will be used below to designate fuzes of the general type described in that application. A typical FM fuze comprises: transmitter means for generating and radiating a radio-frequency signal the frequency or phase of which is modulated at a rate $f_r$; means for receiving a portion of said signal after reflection from a target; mixer means for mixing the signal returned from the target with a local signal taken directly from the transmitter to obtain a mixer output signal having components of frequency $f_r$ and/or integral multiples thereof; a selective amplifier responsive to the frequency $f_r$ or to a particular integral multiple thereof; and detonator-firing means responsive to the output of said selective amplifier.

In known FM fuzes, the above-mentioned detonator-firing means is responsive to the amplitude of the output of the above-mentioned selective amplifier. The amplitude of this output is a function of a number of factors, including transmitter power output, target size, and target reflectivity, as well as fuze-to-target distance. Under some circumstances this output may, before the missile has come within effective range of the target, attain sufficient amplitude to activate the detonator-firing means and thus to cause warhead detonation.

A principal object of the present invention is to provide an FM fuze having improved range cut-off characteristics—that is, an FM fuze that will not cause warhead detonation unless the missile is close enough to the target for warhead detonation to have a good chance of damaging the target.

Another object is to provide an improved FM fuze in which selective amplifier outputs of high amplitude will not cause warhead detonation unless the missile is within a predetermined effective distance from the target.

Still another object is to provide an improved FM fuze adapted to detonate more nearly at a predetermined desired distance from a target than previous FM fuzes, and to be insensitive to very near objects such as the body of the missile in which the fuze is mounted.

Essentially, preferred forms of the invention entail the use of phase information contained in the output of the selective amplifier. The phase of the output signal varies with distance, and comparison of the phase of the output signal with the phase of a signal taken from the modulating oscillator provides a measure of fuze-to-target distance.

Other objects, aspects, uses, and advantages of the invention will become apparent from the following detailed description and from the accompanying drawing, in which—

Figure 1:
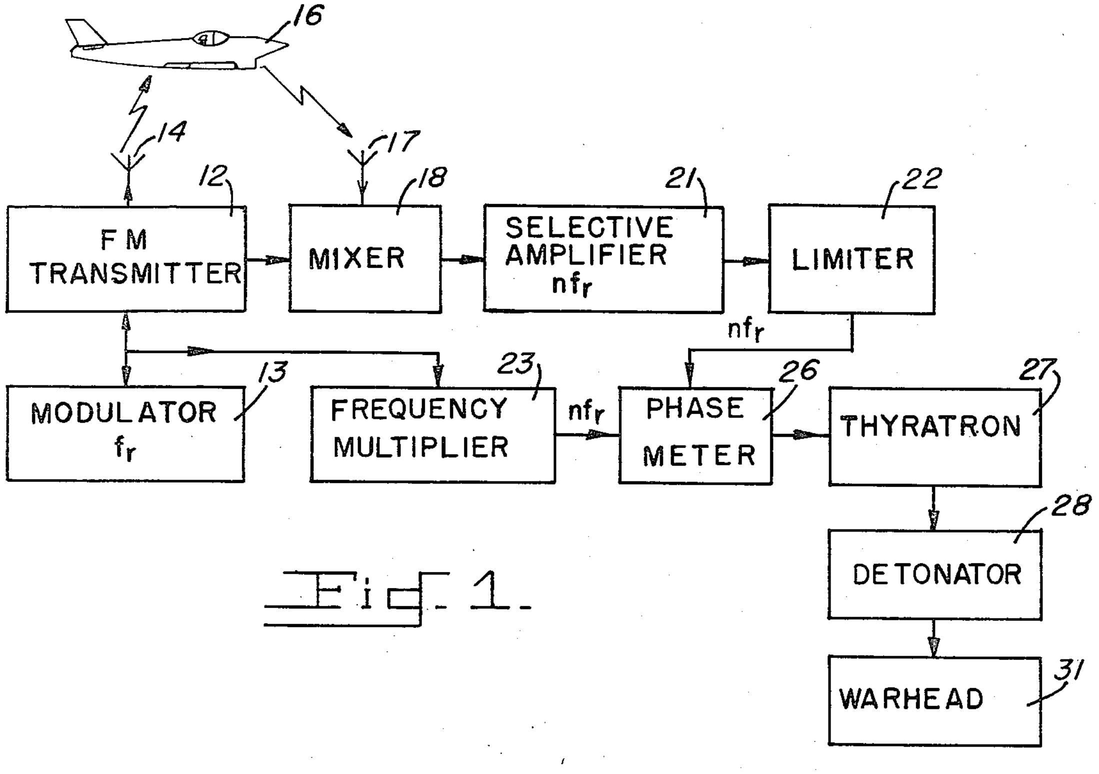
FIG. 1 is a block diagram of a preferred embodiment of the invention.

In FIG. 1 a radio-frequency transmitter 12 is frequency-modulated at a modulation frequency $f_r$ by a modulator 13 and supplies frequency-modulated radio-frequency energy to a transmitting antenna 14. A portion of the energy radiated by antenna 14 strikes a target 16 and is returned to a receiving antenna 17. The returned signal is mixed in a suitable mixer 18 with a local signal taken from transmitter 12. It will be understood that, as more fully explained in the above-identified application, the output of mixer 18, as the fuze approaches target 16, contains components having the modulation frequency $f_r$ and integral multiples thereof. The output of mixer 18 is fed to a highly selective amplifier 21 that is peaked at the frequency $nf_r$, n being an integer. The $nf_r$ signal from amplifier 21 is fed to an amplitude limiter 22. Limiter 22 may be adjusted to hold the amplitude of the $nf_r$ signal to the value that would be expected to result from a small target of low reflection co-efficient located at the maximum effective range of the warhead.

A signal of frequency $f_r$ taken directly from modulator 13 is multiplied in frequency by the integer n by means of a frequency multiplier 23 to obtain a reference signal of frequency $nf_r$ the phase of which is independent of fuze-to-target distance.

It will be understood that, with change of fuze-to-target distance, the phase difference of the $nf_r$ output of limiter 22 will change, with respect to the reference $nf_r$ signal from multiplier 23, at the rate of 360° per half wavelength at the frequency $nf_r$.

The phase of the $nf_r$ signal from limiter 22 is compared with the phase of the $nf_r$ signal from multiplier 23 by means of a phase meter 26. The output of phase meter 26 is a signal the amplitude of which depends upon the phase difference between the two $nf_r$ signals, at least over a range of 0° to 180° of phase difference. Such phase meters are known. When the output of phase meter 26 attains a predetermined amplitude it triggers a thyratron 27 which in turn fires a detonator 28 causing detonation of a warhead 31. It will be understood that phase meter 26 may take the form, among others, of a single linear amplifier or other linear device; such a device, combining the two constant-amplitude $nf_r$ signals, will of course produce a resultant signal that attains maximum amplitude when the return-signal-derived $nf_r$ signal from limiter 22 is in phase with the injected local $nf_r$ signal from multiplier 23.

Figure 2:
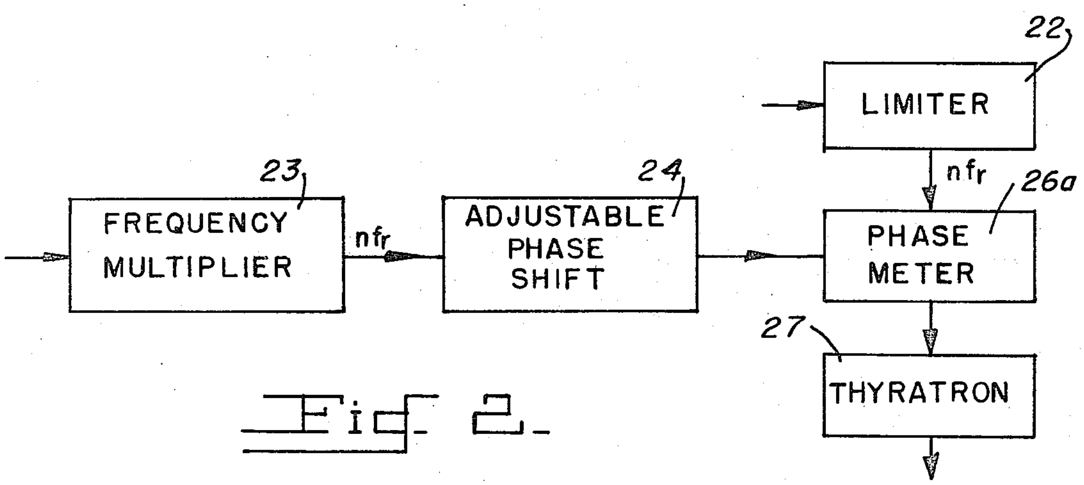
FIG. 2 is a block diagram of another form of the invention.

In FIG. 2, an adjustable phase shift 24 is interposed between frequency multiplier 23 and phase meter **26*a*. Phase meter 26*a* is of a type that gives an output signal that attains maximum amplitude when the two signals compared coincide in phase. The sensitivity of thyratron 27 is adjusted so that thyratron 27 fires when the fuze-to-target distance is such that the $nf_r$ signal from limiter 22 coincides in phase with the $nf_r$ signal from phase shift device 24. It will be understood that the distance at which this phase coincides will occur can be adjusted by adjustment of phase shift device 24.**

It will be understood that it may be desirable to heterodyne both the $nf_r$ signals, using a single local oscillator, to a lower frequency before comparing the phases of the two signals.

One way of measuring the phases of two signals is by generating an output signal consisting of a series of pulses, of constant amplitude, the width of which is proportional to the phase difference between the two signals. The average value of this signal will then be a measure of the phase difference of the two original signals. This result can be achieved by generating pulses corresponding to the positive-going (or negative-going) zero crossings of the two original signals and using these pulses to trigger a bistable multivibrator (flip-flop); it will be readily understood that the multivibrator can thus be caused to be in a first, or "on", condition for a time proportional to the phase difference between the original signals.

Figure 3:
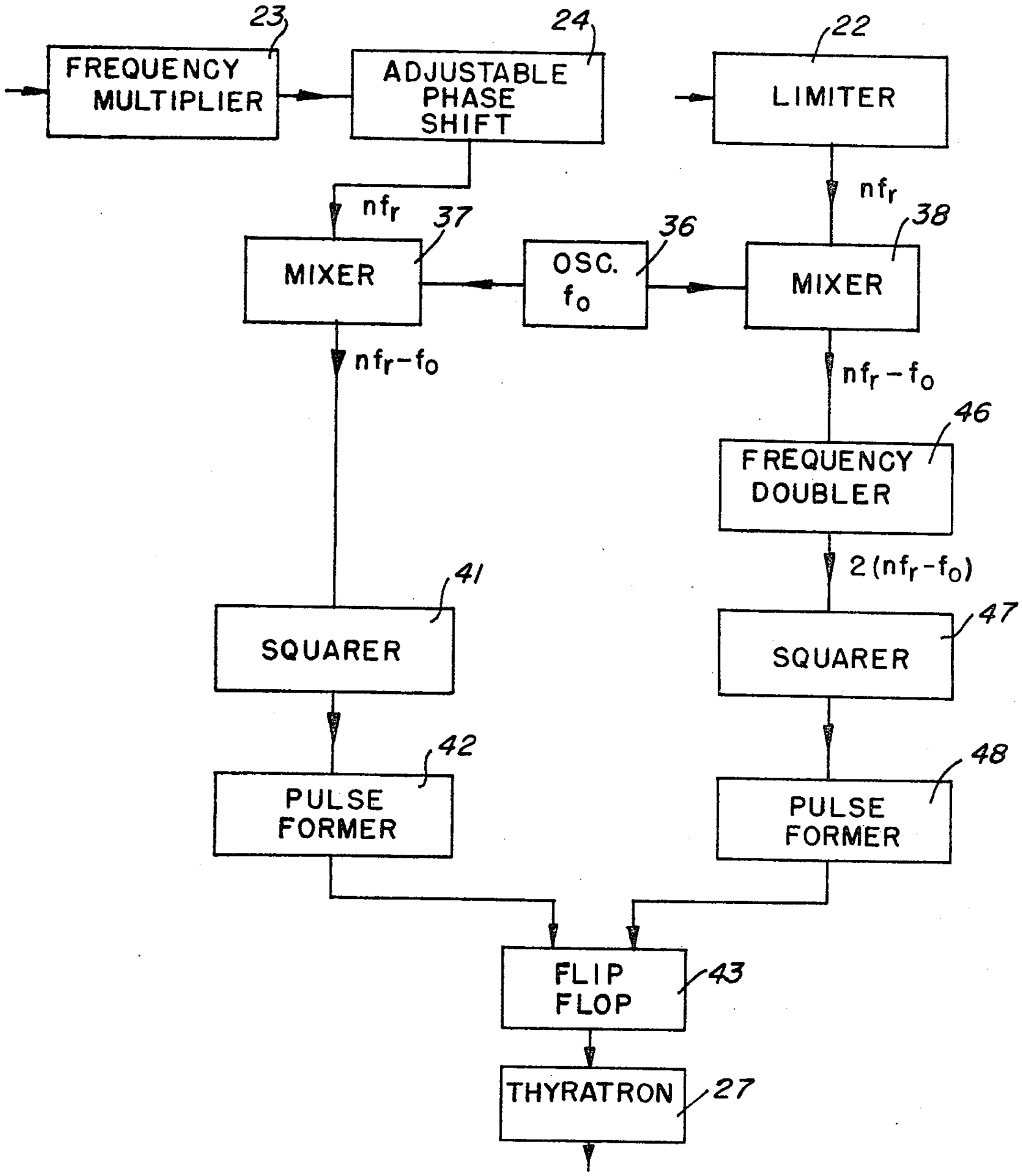
FIG. 3 is a block diagram of still another form of the invention.

In FIG. 3, a local signal of frequency $f_o$ from a local oscillator 36 is mixed with a reference $nf_r$ signal in a first mixer 37 and with a returned-signal-derived $nf_r$ signal in a second mixer 38. The outputs of mixers 37 and 38 are signals of the difference frequency $nf_r$–$f_o$ having the same phase relation as the two $nf_r$ signals applied to the inputs of mixers 37 and 38. The output of mixer 37 is changed from sinusoidal waveform to square waveform by means of a squarer 41. The output of squarer 41 actuates a pulse former 42 adapted to produce a short steep positive output pulse at the beginning of each positive-going step of the output of squarer 41. The output of pulse former 42 is connected to a flip-flop circuit 43.

The output of mixer 38 is doubled in frequency by a frequency doubler 46. The output of doubler 46 is changed from sinusoidal waveform to square waveform by means of a squarer 47. The output of squarer 47 actuates a pulse former 48 adapted to produce a short steep positive output pulse at the beginning of each positive-going step of the output of squarer 41. The output of pulse former 48 is connected to flip-flop circuit 43.

Flip-flop circuit 43 is a bistable circuit having an "on" state and an "off" state. Circuit 43 is adapted to be switched to the "on" state each time it receives a pulse from pulse former 48. While in the "on" state circuit 43 gives a uniform output voltage (or current). Such bistable circuits are known. It will be understood that the average output of circuit 43 is dependent upon the phase difference between the two $nf_r$ signals applied to mixers 37 and 38 respectively.

Doubling the frequency of the output of mixer 38, by means of doubler 46, makes the system independent of the doppler effect. As can be shown, and as is well known to persons familiar with FM fuzes, relative motion of fuze and target will cause the return-signal-derived $nf_r$ signal to be modulated with a doppler-frequency envelope that has amplitude minima at every change in distance of approximately one-quarter wavelength at the center frequency of the transmitter; and the $nf_r$ signal undergoes a 180° phase reversal with each of these minima. Doubling the frequency of the output of mixer 38 is one way of obtaining, from pulse former 48, identical pulses at every zero crossing of the signal from mixer 38, so that the system is unaffected by doppler-produced 180° phase reversals of the $nf_r$ signal.

Figure 4:
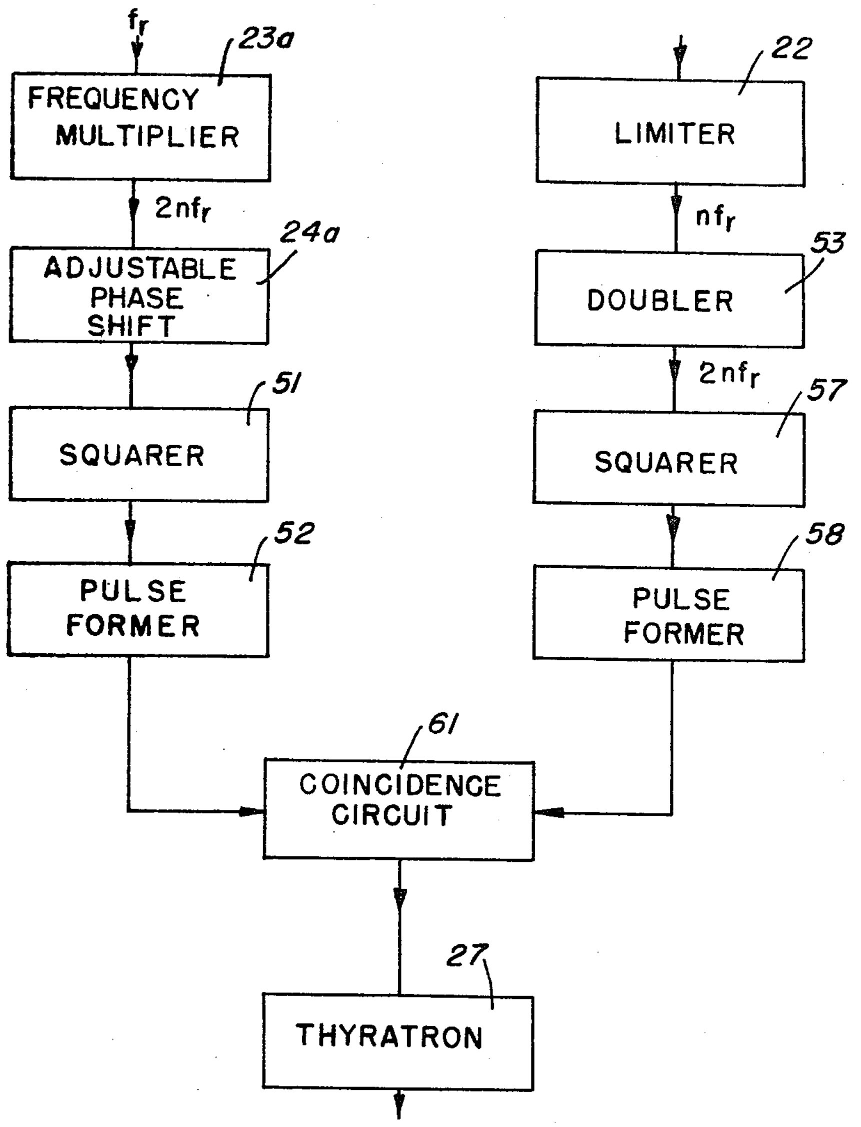
FIG. 4 is a block diagram of yet another form of the invention.

In FIG. 4, a frequency multiplier 23a multiplies a local $f_r$ signal taken from modulator 13 (FIG. 1) by the factor $2n$ to obtain a signal of frequency $2nf_r$ that is passed through an adjustable phase shifter **24*a* and converted to a square wave by squarer 51. The output of squarer 51 actuates a pulse former 52 that gives a steep narrow output pluse in response to the beginning of each positive-going step of the output of squarer 51. Limiter 22 supplies a return-signal-derived $nf_r$ signal to a frequency doubler 53 the output of which is converted to a square wave by a squarer 57. The output of squarer 57 actuates a pulse former 58 that gives a steep narrow output pulse in response to the beginning of each positive-going step of the output of squarer 57. The outputs of pulse formers 52 and 58 are applied to a coincidence circuit 61. Circuit 61 is adapted to give an output pulse, which is applied to thyratron 27, only in response to the simultaneous receipt of pulses from pulse formers 52 and 58. Such coincidence circuits are known. It will be understood that the time relation between the output pulses from pulse formers 52 and 58 will be a function of fuze-to-target distance and that the distance at which these pulses coincide will be a function of the adjustment of phase shift device 24*a*.**

It will be understood that the choice of $nf_r$ may have an important bearing on the operation of the system described. If the wavelength of $nf_r$ is too short there may be objectionable ambiguities. In general, it is desirable that the wavelength of $nf_r$ be more than twice (in some cases, more than 4 times) the maximum fuze-to-target distance at which fuze function is desired.

It will be apparent that the embodiments shown are only exemplary and that various modifications can be made in construction and arrangement within the scope of the invention as defined in the appended claims.

We claim:

1. A radio-proximity ordnance fuze comprising: a generator of radio frequency energy; modulator means for modulating the frequency of said generator with a modulation frequency fr; antenna means for radiating energy from said generator and for receiving a portion of the energy thus radiated upon its return from a reflective target; mixer means for combining frequency-modulated radio-frequency energy thus received with a local frequency-modulated radio-frequency signal taken directly from said generator to obtain a mixer output signal having a component of frequency $nf_r$, $n$ being an integer; selective amplifier means peaked at the frequency $nf_r$ connected to the output of said mixer means for obtaining a return-derived-signal of frequency $nf_r$; a frequency multiplier connected to said modulator means for obtaining a reference signal of frequency $nf_r$ having a constant phase; adjustable phase shift means connected to the output of said frequency multiplier for adjusting the phase of said reference signal to a predetermined value; frequency heterodyning means connected to the outputs of said selective amplifier means and said adjustable phase shift means for obtaining at a first heterodyning means output a reference signal of frequency $nf_r$–$fo$, and at a second heterodyning output a return-derived-signal also of frequency $nf_r$–$fo$; frequency doubler means connected to said second heterodyning means output for obtaining a return-derived-signal of frequency 2 ($nf_r$–$fo$); first squarer means connected to said first heterodyning means output for producing a square wave reference signal of frequency $nf_r$–$fo$; second squarer means connected to the output of said frequency doubler for producing a square wave return-derived-signal of frequency $2(nf_r-fo)$; first pulse former means connected to the output of said first squarer means for producing a reference signal positive output pulse at the beginning of each positive-going step of said square wave reference signal; second pulse former means connected to the output of said second squarer means for producing a return-derived-signal positive output pulse at the beginning of each positive-going step of said square wave return-derived-signal; a bistable flip-flop circuit having an "on" state and an "off" state, said flip-flop circuit being adapted to be switched to the "on" state by said return-derived signal pulses and to be switched to the "off" state by said reference signal pulses, the output of said flip-flop circuit thereby being dependent upon the phase difference between said reference signal of frequency $nf_r-fo$ and of constant and predetermined phase and said return-derived-signal of frequency $nf_r-fo$ whose phase is dependent upon target distance; and detonator-firing means responsive to the attainment of the output of said flip-flop of at least a critical value.

* * * * *